Patented Aug. 21, 1951

2,564,760

UNITED STATES PATENT OFFICE 2,564,760

PROCESS FOR MAKING ALKOXYACETALS

Raymond I. Hoaglin, Charleston, W. Va., and Samuel F. Clark, Oxford, Miss., assignors, by mesne assignments, to Union Carbide and Carbon Corporation, a corporation of New York No Drawing. Application October 26, 1946, Serial No. 706,052

7 Claims. (Cl. 260—615)

The present invention relates to a process for making alkoxyacetals.

It has already been proposed in U. S. Patent No. 2,165,962 to form alkylidene diethers by reacting vinyl ethers with acetaldehyde acetals. The general reaction proposed in this patent is as follows:

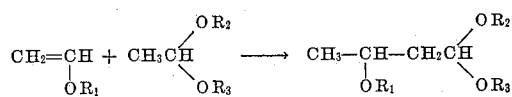

$R_1$, $R_2$ and $R_3$ being alkyl, aralkyl or aryl radicals. We have found that, in fact, the acetal does not unite with the vinyl ether by addition to the double bond, as indicated in this patent, and that the equation corresponds to the products actually formed only in the special instance where $R_1$, $R_2$ and $R_3$ are identical radicals.

We have found that ethers of alpha, beta-unsaturated alcohols react with dialkyl acetals of aldehydes, the sum of the carbon atoms in the unsaturated alcohol and the aldehyde being at least five, by addition across one of the ether linkages of the acetal. This ether linkage then breaks to give the alkoxyacetal. Thus, when vinyl ethers are added to acetals of those aldehydes containing at least three carbon atoms to the aldehyde molecule, the carbon atoms of the alkylidene group of the acetal unite with those of the vinyl group to form a straight chain, rather than a branched chain, as would be the case if addition to the 2-carbon atom of the acetal occurred. The reaction which takes place in this instance may be represented as follows:

A.

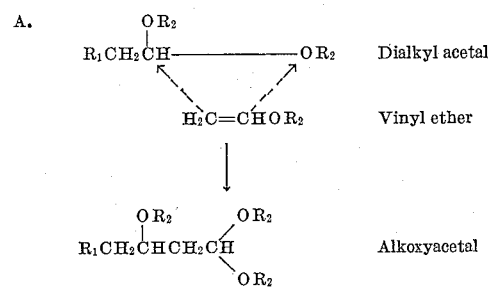

where $R_1$ is an alkyl, aryl or aralkyl radical and $R_2$ is an alkyl radical, such as a methyl, ethyl, propyl, butyl, amyl, hexyl, heptyl or octyl radical.

When the ethers of those alpha, beta-unsaturated alcohols containing at least three carbon atoms to the alcohol molecule are reacted with dialkyl acetals, the ethylenic group adds across one of the ether linkages of the acetal, as before, forming a compound having a branched-chain carbon skeleton. This reaction may be illustrated as follows:

B.

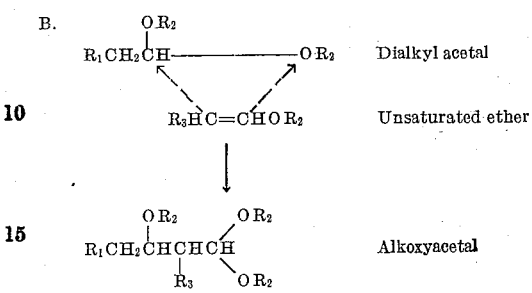

where $R_1$ is hydrogen or an alkyl, aryl or aralkyl radical, and $R_2$ and $R_3$ are alkyl radicals, such as methyl, ethyl, propyl, butyl, amyl, hexyl, heptyl or octyl radicals.

More than one mole of the vinyl ethers may add in step-wise fashion to the dialkyl acetal to form a compound having an extended carbon chain to which is attached a plurality of alkoxy groups. This step-wise or polymerization reaction may be represented as follows:

C.

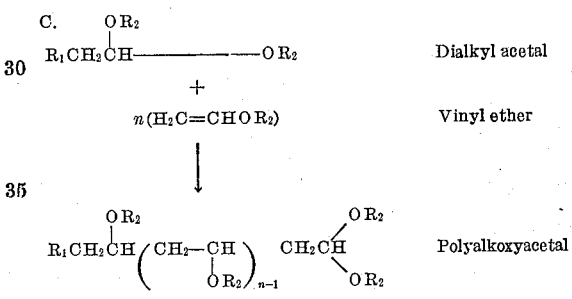

where $R_1$ is an alkyl, aryl or aralkyl radical, $R_2$ is an alkyl radical, and $n$ is a whole number from 2 to 20, for instance. These polymeric derivatives are readily formed by charging a molar excess of the vinyl ether over the dialkyl acetal to the reaction vessel. In fact, if the lower molecular weight addition products are desired in good yields, it is preferable to charge a considerable molar excess of the dialkyl acetal, as shown in the examples.

Several experiments were carried out to demonstrate the addition of ethers of alpha, beta-unsaturated alcohols to dialkyl acetals. In one of these experiments, vinyl ethyl ether was added to diethyl butyral in accordance with the following reaction:

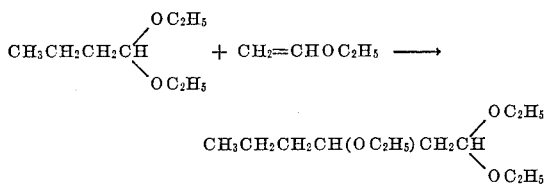

The addition product was simultaneously hydrolyzed and de-ethanolated to form an unsaturated aldehyde. This aldehyde was identified as 2-hexenal, $CH_3CH_2CH_2CH=CHCHO$. From the position of the ethylenic linkage in the aldehyde, and from the fact that the unsaturated aldehyde was a straight chain compound, it is concluded that the addition product was 1,1,3-triethoxyhexane. Such a compound could be formed only by the addition reaction shown immediately above, because, if reaction had occurred by addition of the 2-carbon atom of the acetal to the vinyl group, the unsaturated aldehyde corresponding to the alkoxyacetal would have been 2-ethyl-2-butenal or α-ethylcrotonaldehyde, $$H_3CCH=CCHO$$
$$\phantom{H_3CCH=C}|$$
$$\phantom{H_3CCH=}C_2H_5$$

In another experiment, diethyl acetal was added to ethyl 1-butenyl ether according to the following reaction:

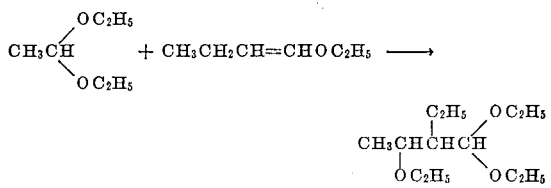

The alkoxyacetal formed according to the reaction was simultaneously hydrolyzed and de-ethanolated to form an unsaturated aldehyde. This aldehyde was identified as α-ethylcrotonaldehyde, proving that the alkoxyacetal formed was 1,1,3-triethoxy-2-ethylbutane. This compound could not have been formed if the 1-carbon atom of the unsaturated ether had added to the 2-carbon atom of the acetal.

In reactions A, B and C designated above, the special case where the $R_2$ radicals are identical has been represented. This is the preferred embodiment of the invention, because easily isolated products are obtained. However, the reaction may be carried out with acetals and unsaturated ethers in which the alkoxy radicals of the acetal and ether linkages are different. In this instance, a number of co-reactions may occur. For example, dibutyl acetal was reacted with vinyl ethyl ether to yield a mixture of products, only two of which, 1,1,3-tributoxybutane and 1-ethoxy-1-butoxyethane were isolated in the pure state. It is assumed that these products were formed as a result of the following equilibrium which may be established:

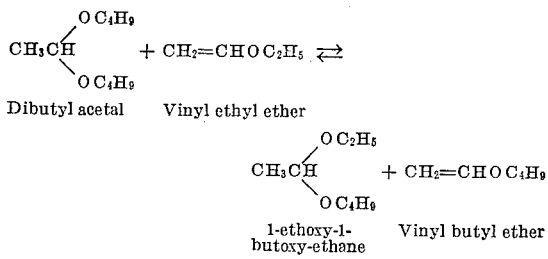

Dibutyl acetal    Vinyl ethyl ether 1-ethoxy-1-
butoxy-ethane    Vinyl butyl ether Thus dibutyl acetal may react with vinyl ethyl ether and/or vinyl butyl ether and 1-ethoxy 1-butoxyethane may also react with vinyl ethyl ether and/or vinyl butyl ether according to the mechanism herein explained to give a complex mixture of ethoxy- and butoxyacetals.

The addition reactions of this invention are preferably carried out at temperatures of 25° to 75° C. in the presence of a boron trifluoride catalyst. Our preferred catalyst is the complex compound of boron trifluoride and diethyl ether. The amount of the catalyst may be between 0.01 and 0.5% of the reactants. The reaction may be carried out by simple mixing of the reactants accompanied by external cooling. The temperature may also be controlled by slow addition of the unsaturated ether to the dialkyl acetal accompanied by vigorous stirring. After completion of the reaction, the catalyst is neutralized with an alkaline reagent, such as sodium hydroxide, sodium carbonate, or sodium bicarbonate. The mixture is then distilled to recover the unchanged dialkyl acetals, and to isolate the higher boiling alkoxyacetals.

The alkoxyacetals are valuable as solvents and plasticizers and as chemical intermediates. The alkoxyacetals are readily converted to unsaturated aldehydes which may be reduced to saturated alcohols. The alkoxyacetals may also be hydrolyzed to alkoxyaldehydes which may be reduced or oxidized to the corresponding alkoxyalcohols or alkoxyacids. Hydrogenolysis of the acetal group of the alkoxyacetal may also be carried out, in which event alkyl ethers of polyhydric alcohols are obtained. Thus, the reaction of this invention is a very valuable tool for the industrial organic chemist in building up higher molecular weight compounds starting with simple, readily available compounds. In industrial practice, the initial raw material may be any of the cheap, readily available alcohols, such as ethanol and butanol. The alcohols may be oxidized to aldehydes, and the dialkyl acetals may be formed from the alcohols and the aldehydes. The alpha, beta-unsaturated ethers are readily formed by passing the dialkyl acetals over appropriate catalysts.

The following examples will illustrate the preparation of various alkoxyacetals.

*Example 1.—The reaction of vinyl ethyl ether and diethyl butyral*

Four hundred and fifty-nine (459) grams (6.37 moles) of vinyl ethyl ether were added by means of a dropping funnel to 4,650 grams (31.85 moles) of diethyl butyral containing 4 cc. of a diethyl ether solution of boron trifluoride-diethyl ether complex (35% boron trifluoride). The mixture was stirred constantly during the addition of the ether and the temperature was maintained at 43 to 51° C. by means of external cooling and regulation of the flow of vinyl ethyl ether. After all the ether had been added stirring was continued until the temperature dropped to that of the room. Then the catalyst was neutralized with an excess of solid sodium carbonate, and stirring was continued about two hours. The reaction product was distilled, and the unreacted diethyl butyral was recovered. A compound boiling at 85° at 5 mm. (specific gravity 0.874 at 20°/20° C.) was obtained in 69.5% yield based on vinyl ethyl ether. This compound was identified as 1,1,3-triethoxyhexane by hydrolysis to the unsaturated aldehyde, 2-hexenal. The remaining portion of the vinyl ethyl ether which reacted was recovered as a mixture of condensation products of diethylbutyral containing more than one mole of vinyl ethyl ether.

*Example 2.—The reaction of diethyl 2-ethylhexal and vinyl ethyl ether*

A mixture of 5357 grams (26.4 moles) of diethyl 2-ethylhexal and 7 cc. of a diethyl ether solution of boron trifluoride-diethyl ether complex (35% boron trifluoride=0.05% $BF_3$ based on the weight of the acetal) was stirred and warmed to 45° C. To this mixture was added with good agitation 494 grams (6.6 moles) of vinyl ethyl ether (96.2% vinyl ethyl ether, 3.8% diethyl ether). The rate of addition was regulated, so that by cooling with water a reaction temperature of 45 to 47° C. was maintained. The addition of the vinyl ethyl ether required 20 minutes, after which the mixture was stirred an additional two hours and was then neutralized with 14 grams of sodium carbonate. The reaction product was distilled under vacuum to recover unreacted diethyl 2-ethylhexal and the product, 1,1,3-triethoxy-4-ethyloctane. The yield of the latter compound was 66.5%, based on the vinyl ethyl ether. 1,1,3-triethoxy-4-ethyloctane has a boiling point of approximately 94° C. (1 mm. Hg.), sp. gr. (20/20° C.) 0.873 and refractive index ($N_D^{20}$) 1.4277. Higher boiling products were obtained, but not isolated as pure compounds.

*Example 3.—The reaction of diethyl acetal and ethyl 1-butenyl ether*

A mixture of 1062 grams (9 moles) of diethyl acetal and 1 cc. of a diethyl ether solution of boron trifluoride-diethyl ether complex (35% boron trifluoride—approximately 0.04% $BF_3$ based on the weight of the acetal) was stirred and warmed to 47.5° C. Ethyl 1-butenyl ether (300 grams, 3 moles) was added from a dropping funnel in a period of 10 minutes. The reaction was essentially complete within 20 minutes after all the unsaturated ether was added. The mixture was stirred an additional two hours and then the catalyst was neutralized by agitation with 5 grams of sodium carbonate. After recovering the unreacted diethyl acetal by vacuum distillation, a product identified as 1,1,3-triethoxy-2-ethylbutane was obtained in 48.1% yield, based on the ethyl 1-butenyl ether charged. 1,1,3-triethoxy-2-ethylbutane has a boiling point of about 76° C. (5 mm. Hg.), sp. gr. (20/20° C.) 0.881 and refractive index ($N_D^{20}$) 1.4172. No higher boiling ethoxyacetals were isolated as pure compounds.

*Example 4.—The reaction of vinyl ethyl ether and diethyl hexal*

Vinyl ethyl ether (1 mole) was reacted with 5 moles of diethyl hexal in the manner described in the foregoing examples. 1,1,3-triethoxyoctane was obtained in a yield of 57.4% based on the vinyl ethyl ether.

Alkyl ethers of alpha, beta-unsaturated alcohols other than those shown in the foregoing examples may be reacted with dialkyl acetals to form a series of useful compounds. When ethers of vinyl alcohol are employed, the invention provides a means of increasing the carbon length of the augend compound by units of two, depending on the number of moles of the vinyl ether added. Thus, by starting with an acetal of an aldehyde having an odd number of carbon atoms, for instance diethyl propional, and adding one mole of vinyl ethyl ether, it is possible to form an alkoxyacetal having a straight carbon chain of five carbon atoms. From this alkoxyacetal the corresponding normal alkanol, pentanol, may readily be derived as a commercial product. In this respect, our reaction is not analogous to the known reaction of diethyl acetal and vinyl ethyl ether, as the predicted compound based on prior art teachings would have been, in the case above, an alkoxyacetal having a branched-carbon chain, from which only a branched chain five carbon atom alcohol could be obtained. Thus, our invention may provide a cheap method for making pure, normal amyl alcohol of a grade superior to that of the impure product derived from fusel oil.

Subject matter disclosed in this application is claimed in our continuation-in-part application, Serial No. 35,968, filed June 29, 1948, entitled "Process for Making Branched-Chain Alkoxyacetals."

We claim:
1. 1,1,3-trialkoxy alkanes containing at least 5 alkane carbon atoms.
2. Alkoxyacetals of the formula:

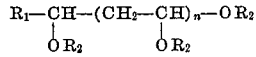

wherein $R_1$ is an alkyl radical containing at least two carbon atoms, the groups $R_2$ are lower alkyl radicals, and $n$ is an integer.
3. 1,1,3-trialkoxy hexanes.
4. Ethoxyacetals of the formula:

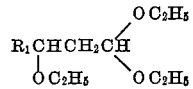

wherein $R_1$ is an alkyl radical containing from 3 to 7 carbon atoms.
5. 1,1,3-triethoxyhexane.
6. 1,1,3-triethoxy-4-ethyloctane.
7. 1,1,3-triethoxyoctane.

RAYMOND I. HOAGLIN.
SAMUEL F. CLARK.

REFERENCES CITED

The following references are of record in the file of this patent:

UNITED STATES PATENTS

| Number | Name | Date |
|---|---|---|
| 2,165,962 | Cunradi et al. | July 11, 1939 |